(12) United States Patent
Russell et al.

(10) Patent No.: US 9,965,377 B1
(45) Date of Patent: May 8, 2018

(54) DEPLOY PIPELINE FOR DEVELOPMENT PACKAGES

(71) Applicant: EMC Corporation, Hopkinton, MA (US)

(72) Inventors: James Russell, Pleasant Grove, UT (US); Ryan Gifford, Eagle Mountain, UT (US); Felippe Burk, Herriman, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days. days.

(21) Appl. No.: 15/084,242

(22) Filed: Mar. 29, 2016

(51) Int. Cl.
*G06F 9/44* (2006.01)
*G06F 11/36* (2006.01)

(52) U.S. Cl.
CPC ............... *G06F 11/3684* (2013.01)

(58) Field of Classification Search
CPC ................................. G06F 11/3684
USPC .................. 717/123–129, 174–177
See application file for complete search history.

(56) References Cited

U.S. PATENT DOCUMENTS

| | | | | |
|---|---|---|---|---|
| 6,298,478 B1* | 10/2001 | Nally | ............... | G06F 9/466 717/170 |
| 6,405,364 B1* | 6/2002 | Bowman-Amuah | ..... | G06F 8/20 717/101 |
| 6,701,514 B1* | 3/2004 | Haswell | ............... | G06F 11/3664 707/999.102 |
| 6,859,922 B1* | 2/2005 | Baker | ................ | G06F 11/3414 705/51 |
| 6,907,546 B1* | 6/2005 | Haswell | ............... | G06F 11/3684 714/38.11 |
| 7,152,229 B2* | 12/2006 | Chong | ..................... | G06F 8/10 717/131 |
| 7,203,928 B2* | 4/2007 | Mandava | ............ | G06F 11/3688 714/E11.207 |
| 7,496,906 B2* | 2/2009 | Black-Ziegelbein | | G06F 11/3624 717/124 |
| 7,873,946 B2* | 1/2011 | Lathrop | ............ | G06F 17/30271 715/204 |
| 7,992,133 B1* | 8/2011 | Theroux | ............. | G06F 11/3664 709/201 |
| 8,024,708 B2* | 9/2011 | Demetriou | .......... | G06F 11/3664 714/35 |
| 8,549,475 B1* | 10/2013 | Cameron | ............. | G06F 9/4428 717/116 |
| 8,677,315 B1* | 3/2014 | Anderson | ................ | G06F 8/60 717/101 |

(Continued)

OTHER PUBLICATIONS

Galik et al, "Generating Connectors for Heterogeneous Deployment", ACM, pp. 54-61, 2005.*
Krupezak et al, "Increasing the Portability and Re-Usability of Protocol Code", IEEE/ACM Transactions on Networking, vol. 5, No. 4, pp. 445-459, 1997.*

(Continued)

*Primary Examiner* — Anil Khatri
(74) *Attorney, Agent, or Firm* — Workman Nydegger

(57) ABSTRACT

In one example, a method includes receiving a partially complete development package, verifying one or more parameters of the development package, and approving the development package for code development upon satisfactory verification. Next, developer code is received and packaged into the partially complete development package to create a completed development package. The completed development package is then deployed to a group of nodes where the code can be run and tested.

19 Claims, 9 Drawing Sheets

(56) References Cited

U.S. PATENT DOCUMENTS

| | | | | |
|---|---|---|---|---|
| 8,689,188 | B2 * | 4/2014 | Bassin | G06F 11/3672 |
| | | | | 702/182 |
| 8,799,868 | B2 * | 8/2014 | Ndem | G06F 11/3676 |
| | | | | 717/124 |
| 8,904,357 | B2 * | 12/2014 | Eade | G06F 8/20 |
| | | | | 717/125 |
| 8,966,454 | B1 * | 2/2015 | Michelsen | G06F 11/3466 |
| | | | | 709/223 |
| 9,183,123 | B2 * | 11/2015 | Spektor | G06F 11/36 |
| 9,268,597 | B2 * | 2/2016 | Bradshaw | G06F 9/466 |
| 9,292,276 | B1 | 3/2016 | Chou | |
| 9,396,037 | B2 * | 7/2016 | Morsi | G06F 9/5083 |
| 9,489,647 | B2 * | 11/2016 | Martinez | G06F 8/36 |
| 2006/0195831 | A1 | 8/2006 | Bossom | |
| 2009/0249299 | A1 | 10/2009 | Farchi | |
| 2009/0271451 | A1 | 10/2009 | Young | |
| 2010/0057735 | A1 | 3/2010 | Srinivasan | |

OTHER PUBLICATIONS

Jenkins, "Getting Started with Pipelines", Google Serach, pp. 1-9, 2017: https://jenkins.io/pipeline/getting-started-pipelines/.*
Earle et al, "Verifying Fault-Tolerant Erlang Programs", ACM, pp. 26-34. 2005.*
Cai et al, "Certified Self-Modifying Code", ACM, pp. 66-77, 2007.*
Backes et al, "Computationally Sound Verification of Source Code", ACM, pp. 387-398, 2010.*
Sashadri et al, "Pioneer: Verifying Code Integrity and Enforcing Untampered Code Execution on Legacy Systems ", ACM, pp. 1-16, 2005.*
Bernini et al, "A Software Architecture for the Deployment of Executable Transformation Models ", ACM, pp. 47-51, 2009.*
U.S. Appl. No. 15/084,285, filed Mar. 29, 2016, James Russell, et al.
U.S. Appl. No. 15/084,285, filed Jun. 5, 2017, Office Action.
Final Office Action of U.S. Appl. No. 15/084,285 dated Jan. 10, 2018.

* cited by examiner

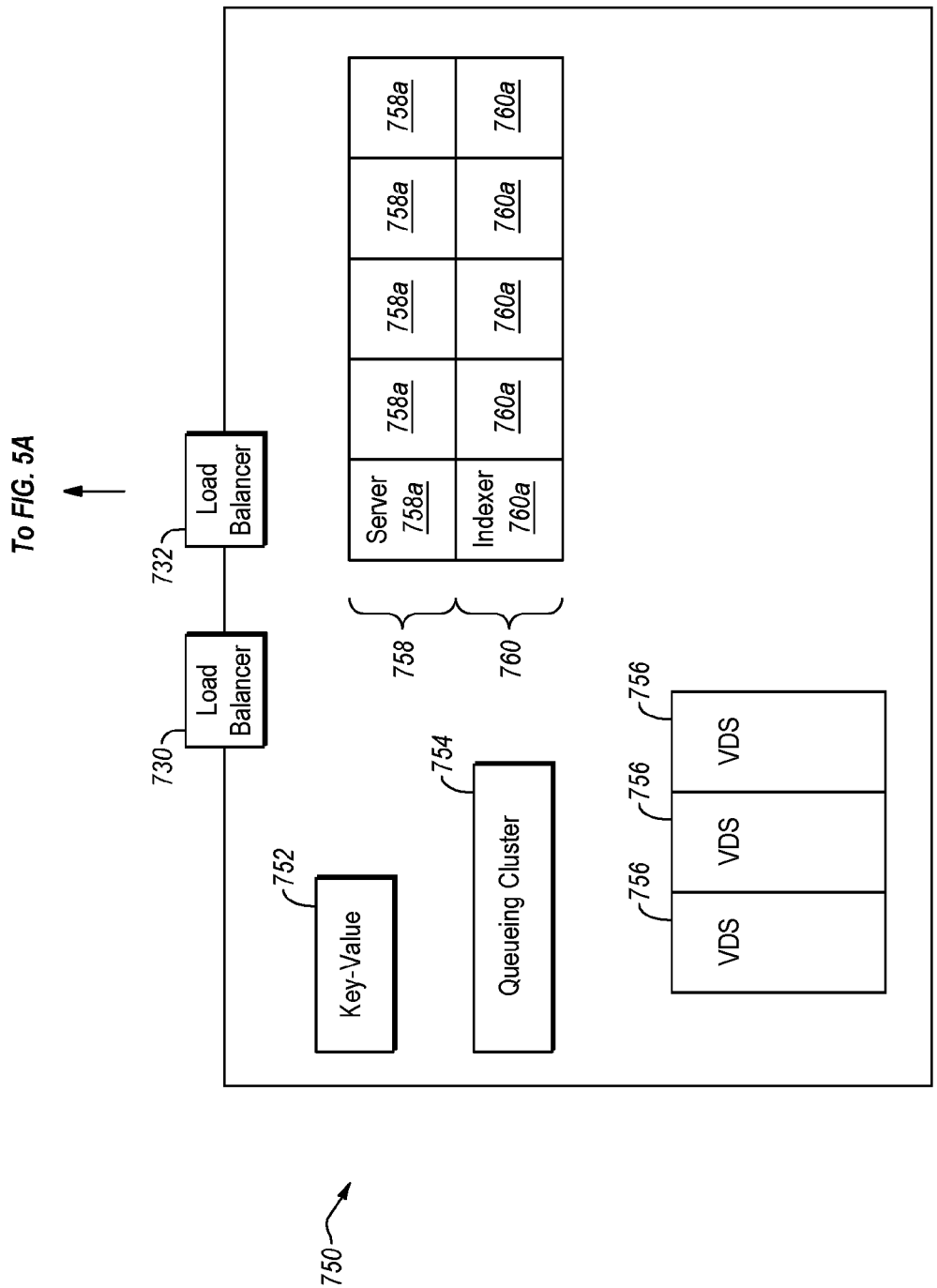

DEPLOY PIPELINE FOR DEVELOPMENT PACKAGES

RELATED APPLICATIONS

This application is related to U.S. patent application Ser. No. 15/084,285, entitled CREATION AND USE OF DEVELOPMENT PACKAGES, filed the same day herewith, and incorporated herein in its entirety by this reference.

FIELD OF THE INVENTION

Embodiments of the present invention generally concern development, testing and deployment of code. More particularly, at least some embodiments of the invention relate to systems, hardware, computer-readable media, and methods directed to a development structure and deployment pipeline that enable development, testing, and deployment of code. In some embodiments, the code can relate to data backup and restore functions.

BACKGROUND

Code developers often work as part of a group to develop software for implementing a variety of functions. Projects that are relatively large and/or require a variety of different software pieces may involve multiple developers. The developers for a project may be co-located at a common location, or may work at a variety of different locations, which can be widely dispersed. As well, and depending on considerations such as the particular nature and volume of their work, different developers or groups of developers may complete their work at different times. Moreover, where developers are organized in groups, each group of developers may have its own particular code building tools, and development structure and processes. As well, the programming languages used in the code writing processes may vary from one developer, or group of developers, to the next. In some cases, code written in one language must be translated to another language. Finally, at least some development processes involve the use of a single code base that is accessed and used by all of the developers. Such a single code base can be quite large.

Considerations such as those noted above can give rise to a variety of problems that can affect, among other things, the pace of the development process, deployment of the end product, and the quality of the end product. For example, because the developer groups may be dependent upon each other, the pace of development may be relatively slow and complicated. As well, the use of a single code base can present storage and availability problems, and also introduces complexity into the code development processes. Moreover, the use of different programming languages, testing requirements, code building tools, and other group-specific parameters, also tends to lend complexity to the overall process, and can slow the pace of development.

In view of problems such as those noted above, and others, it would be useful to provide processes and mechanisms that enable code packages to be developed, tested, and deployed, independently of each other. As well, it would be useful to create and implement a standardized code development structure and code deployment pipeline that can be used by a variety of developers or developer groups who may be working according to differing sets of constraints and parameters.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 5b discloses aspects of various elements of an EU;

DETAILED DESCRIPTION OF SOME EXAMPLE EMBODIMENTS

Figure 1:
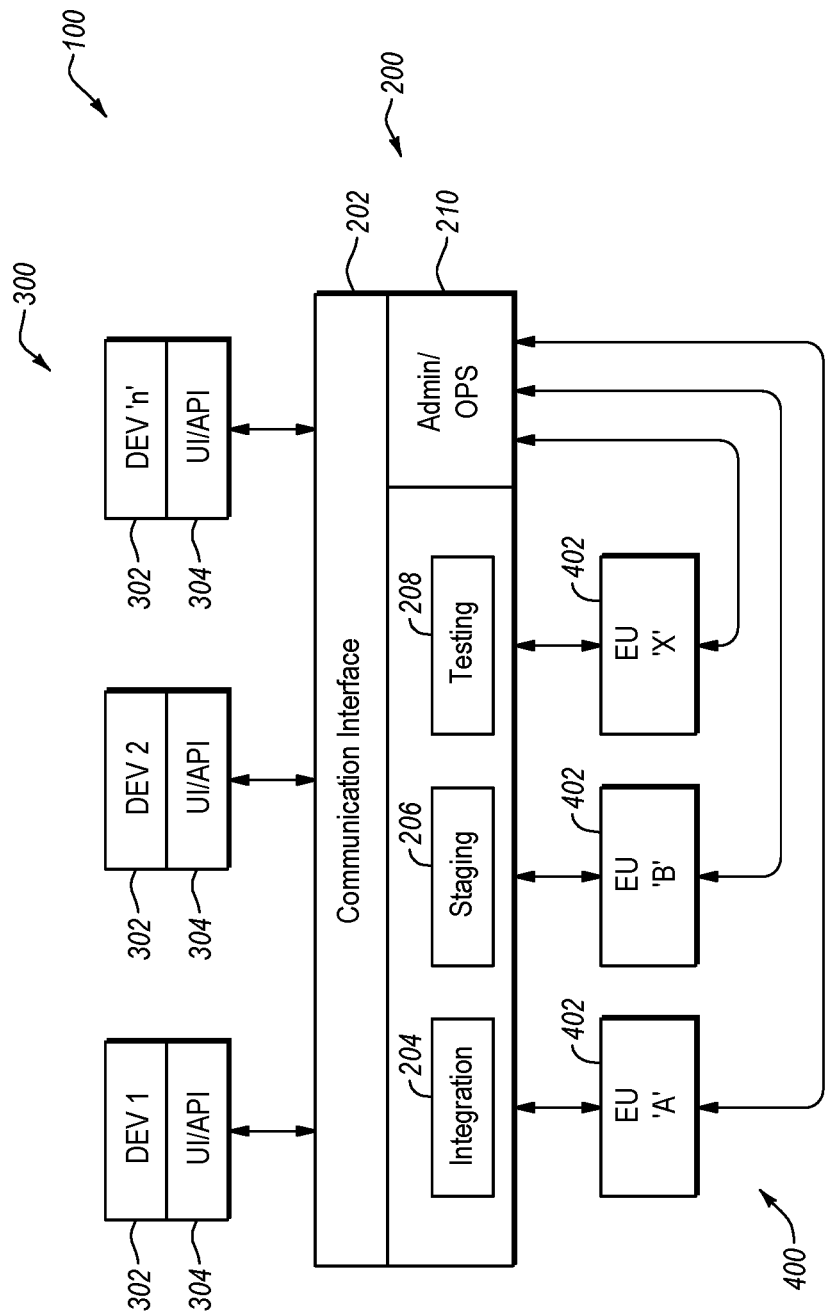
FIG. 1 is directed to aspects of an example operating environment for at least some embodiments.

Embodiments of the present invention generally concern development, testing, and deployment of code packages. More particularly, at least some embodiments of the invention relate to systems, hardware, computer-readable media, and methods directed to the implementation and use of a standardized code development structure and code deployment pipeline that can be used by a variety of developers or developer groups who may be working according to differing sets of constraints and parameters. In some embodiments, the code can relate to services that may be used in cloud-based data backup and restore applications and functions, but that is not required, and embodiments of the invention can, more generally, be employed in connection with the development and deployment of any type of code for any application.

In at least some embodiments, code is developed in discrete packages, each of which may correspond to a particular service that can be provided as part of the operation of a larger application that includes the various code packages. Each of the code packages may be included in a respective development package. A development package can take the form of a folder structure and may include, in addition to a code package, the name of the service performed by the code package, a version code, an implementation directory, and a container. The container may include metadata, such as information and/or instructions concerning how to run the code package, and how to test the code package. The development package can be built by the developer, and all of the information in the development package can be specified, or generated, as applicable, by the developer. As well, the code package can employ any programming language.

In connection with its creation and eventual deployment, the development package can move through a variety of stages. Such a grouping of stages, which can be arranged in serial fashion in some embodiments, can be referred to herein as a deployment pipeline. In some implementations, the stages of the deployment pipeline can be grouped together in various phases, such as an integration phase, a staging phase, and a production phase, for example. One or more stages of the deployment pipeline can be performed in the context of an environment, in the form of an environmental unit (EU), that has been specifically defined and constructed for performance of any process(es) associated with that stage. In some embodiments, movement through some, or all, stages of the deployment pipeline takes place automatically. Additionally, or alternatively, movement through some, or all, stages of the deployment pipeline can be a manual process that must be initiated by user, such as by way of a user interface (UI).

The initial stage of the integration phase is a verification stage at which a user submits a development package for review to ensure that the development package is usable. At this stage, the development package may be skeletal in the sense that it include various components and information, but does not yet include any code. The deployment pipeline can open the package and check to verify that all the correct components and information are included in the development package are identified and verified.

The next stage of the integration phase is the build stage at which the developer, or developers, build the code that is to be included in the development package. In addition to the code, the developers can also create tests and test criteria for use in the testing of the code. In this phase, the development package and related artifacts are archived and stored for future use in later parts of the deployment pipeline.

In the internal deployment stage of the integration phase, one or more instances of the code are deployed, such as by a container management system, to respective nodes for testing purposes. Once the code is deployed to the nodes, it can then be run.

The final stage of the integration phase of the deployment pipeline is testing of the code. The code can be tested in accordance with tests and criteria specified by the developer and included in the development package. The testing may continue until the code passes all the required tests. The tests also can be decoupled from the deployment and run during other future stages of the deployment pipeline, or manually at any time.

The next phase of this example deployment pipeline is the staging phase, which can include a deployment stage, and a testing stage. In the staging phase, the code is run again from the container. The processes performed in the staging phase can be similar, or identical, to those performed in the deploy and test stages of the integration phase.

The final phase of the present example of the deployment pipeline is a production phase. The production phase can include a deployment to production stage, and a production testing stage. In the production phase, the code is run again from the container. The processes performed in the production phase can be similar, or identical, to those performed in the deploy and test stages of the staging phase.

Advantageously then, at least some embodiments of the invention provide for a deployment pipeline that enables code packages to be developed, tested, and deployed, independently of each other. As well, various stages of the deployment pipeline can operate in connection with different respective environments that are tailored to the processes being performed at that particular stage.

A. Aspects of an Example Operating Environment

With attention now to FIG. 1, details are provided concerning an example operating environment 100 for at least some embodiments of the invention. The operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers, clients and other computers and devices that are interconnected.

The example operating environment 100 can include a deployment pipeline 200 configured for communication, such as by way of a communication interface 202, with a group 300 of one or more developers 302. A group 400 of one or more environmental units (EU) 402 is also provided and the EUs 402 are configured to communicate with the deployment pipeline 200. The developers 302 can also access the EUs 402 by way of the deployment pipeline 200.

As further indicated in FIG. 1, the deployment pipeline 200 generally provides a variety of services to the developers 302. Such services can be organized, for example, in an integration phase 204, a staging phase 206, and a testing phase 208. In general, operations during a phase occur independently of operations in any other phase. Administration/operations services 210 can also be provided by the deployment pipeline 200. Among other things, the administration/operations services 210 can handle the building of the EUs 402, and can coordinate operations within the deployment pipeline 200, as well as communications with the developers 302. Finally, the deployment pipeline 200 can be implemented as an application, or a group of applications, that are hosted on one or more corresponding host devices, such as one or more servers for example.

With continued reference to FIG. 1, each of the developers 302 can be implemented as software that runs on a corresponding host device and enables a user to create and modify development packages that will be submitted to the deployment pipeline 200. Each of the developers 302 can run independently of the other developers 302. A user operating the developer 302 can communicate with the deployment pipeline 200 using any suitable interface 304, such as a User Interface (UI) or Application Program Interface (API) for example. The developers 302 can operate with the deployment pipeline 200 in a client-server, respectively, relationship.

As noted earlier, the operating environment 100 can include one or more EUs in connection with which operations of the deployment pipeline 200 are performed. The EUs are each configured to communicate with the deployment pipeline 200, and the EUs operate independently of each other. Management of the EUs, including their construction, configuration, and operation, can be implemented by and/or at the direction of the administration/operation service 210 of the deployment pipeline 200. There is no limit to the number of EUs that can be provided. An EU can be provided on an ad-hoc basis and then dismantled when no longer needed, or the EU can be persistent. The operating environment can include both ad-hoc and persistent EUs. As well, one or more EUs can be cloned from an EU template and then further adapted to suit the needs of particular processes expected to be run in the EU.

B. Example Host Configuration

Figure 2:
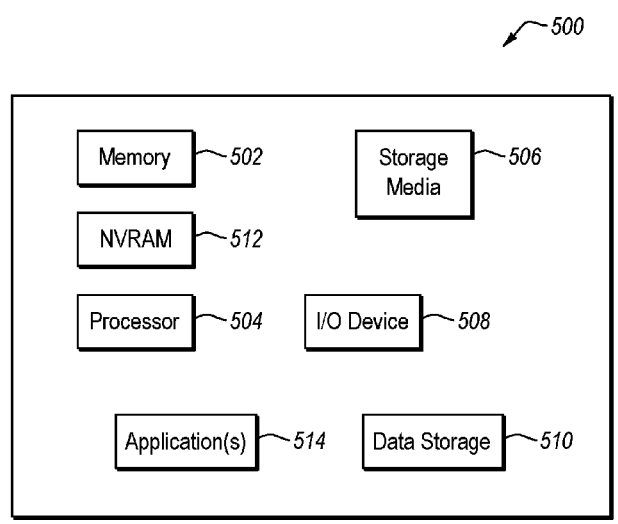
FIG. 2 discloses aspects of an example host device.

With reference briefly to FIG. 2, one or more of the deployment pipeline 200, developers 302 and EUs 402 can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a developer application, a verification application, a build application, a test application, a deploy application, or any combination of these. As well, the executable instructions can implement any of the methods disclosed herein. Additional, or alternative, applications can likewise be included in the applications 514.

C. Aspects of an Example Deployment Pipeline

Figure 3:
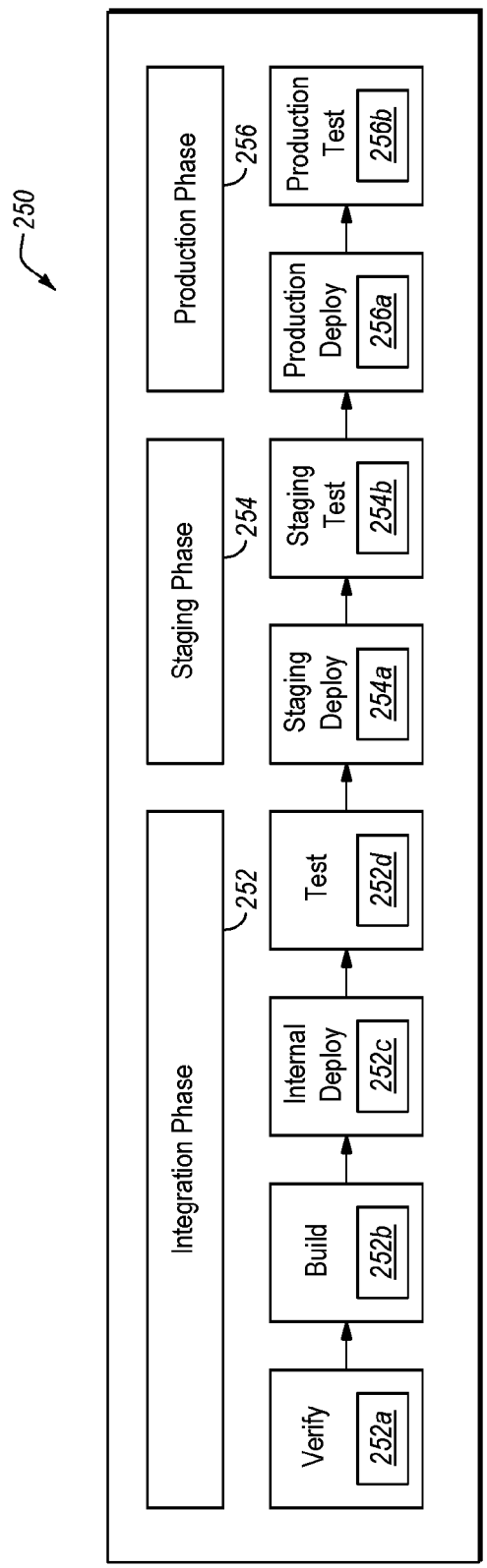
FIG. 3 discloses aspects of an example deployment pipeline.

With reference now to FIG. 3, some aspects of an example embodiment of a deployment pipeline 250 are addressed. In general, the deployment pipeline 250 serves to prepare development packages for eventual deployment where they can be employed by an end user. Each of the development packages can relate to a particular service that is provided when code in the development package is executed. At least some embodiments of the deployment pipeline 250 can employ aspects of the Jenkins build component (which can be installed by running Java-jar jenkins.war) for building and testing software, although the use of Jenkins and its elements is not required. One advantage of embodiments of the invention relative to components such as the Jenkins build component is that such embodiments integrate development and deployment into a single process.

The end user for the services provided by the development packages can be, for example, another development package, a user within the enterprise that created the development package, or a customer of the enterprise, or any other party or entity. As such, the deployment pipeline 250 can perform, or cause the performance of, various processes to that end. In some embodiments, the development packages handled by the deployment pipeline 250 relate to processes, methods, and applications for the backup and/or restoration of data, such as in a cloud datacenter for example. However, the scope of the invention is not limited to this example, which is provided only for the purposes of illustration.

In general, the deployment pipeline 250 can comprise, or consist of, three different phases of deployment of a development package, such as can be created by way of a developer 302. Namely, the deployment pipeline 250 can include an integration phase 252, a staging phase 254, and a production phase 256. Each of these phases can comprise, or consist of, one or more processes, and the phases can be performed in serial fashion, beginning with the integration phase 252. More, or fewer, phases can be employed in a deployment pipeline. Within each phase, the disclosed processes can be performed once, or recursively if necessary. As well, the functionalities ascribed to the disclosed phases are presented by way of example and, in other embodiments, any of the functionalities could be allocated to other phases and more and/or different functionalities could be employed. Thus, the deployment pipeline 250 is presented in the interest of illustrating various concepts and is not intended to limit the scope of the invention in any way. Finally, the time required for each stage of a phase can vary from one stage to another. Thus, the process(es) associated with one stage may be performed relatively more quickly, or more slowly, than the process(es) associated with another stage.

Initially, a user operating a developer 302 (see, e.g., FIG. 1) can create a development package, as disclosed in more detail in the application identified in the 'Related Applications' section hereof. The development package is then submitted by the user to the deployment pipeline 250, and enters the deployment pipeline 250.

With particular reference first to the integration phase 252, this phase is concerned with, among other things, ensuring that the development package interoperates correctly with other development packages, and does not include any information, structures, or other attributes that are likely to cause errors or other problems when the code in the development package is run. Thus, the first stage of the integration phase 252 is a verification stage that can be performed by a verification component 252a. In some embodiments, the verification component 252a and its functionality can be supplied by the Jenkins build component, but that is not required.

At the verification stage, a user submits a development package for review to ensure that the development package is usable. At this stage, the development package may be skeletal in the sense that it includes various components and information, but does not yet include any code. The verification component 252a can perform a high level check on the development package by opening the development package, which can be in a tar.gz format for example, and checking to verify that all the correct components and information are included in the development package are identified and verified.

Such components and information can include, for example, the programming language expected to be used in development of the code that is to be added to the development package, any applicable definitions, a service name, version number, dependencies upon other services, and container information. As well, the development package can be checked by the verification component 252a to make sure that there are no code variables or other aspects of the development package that may cause errors or fails later on. The development package can also be checked at this stage to ensure that the code of the development package is interacting properly with any service or services upon which that code is dependent.

The next stage of the integration phase 252 is the build stage, at which the developer, or developers, can use a build component 252b to build the code that is to be included in the development package that was created by the developer 302. In addition to building the code, the developers can also use the build component 252b to create tests and test criteria for use in the testing of the code. As well, the container that will hold the code is built during the build stage, and container of the development package is then uploaded to a container repository.

In the internal deployment stage of the integration phase 252, an integration deployment component 252c can deploy one or more instances of the code, or containers that include the code, to respective nodes for testing purposes. In some cases, at least two instances of the code are deployed as a default, but more, or fewer, instances can be deployed in other embodiments. As well, the code can be moved between nodes if desired.

The code can be in the form of a containerized application, and deployment of the code to the nodes can be implemented by a container management system. As discussed in more detail below, one example of such a container management system is the Kubernetes system, although the use of the Kubernetes system is not required. The container management system can operate in conjunction with, or be a part of, an environmental unit (EU) for the deployment stage. Once the code is deployed to the nodes, the code can then be run. It should be noted that, in general, the code may run in the same way in the deployment environment of the deployment pipeline 250 as it does in the local environment of the developer 302.

The final stage of the integration phase of the deployment pipeline is testing of the code, which can involve the use of an integration test component 252*d*. The code can be tested in accordance with tests and criteria specified by the developer and included in the development package. The testing may continue until the code passes all the required tests. In some instances, the developer may create a separate container for the tests that are to be run. The test code container can be deployed by the container management system to the nodes together with the code container. As the tests are run, the results are reported by the integration test component 252*d* to the developer 302. In general, the integration test component 252*d* does not analyze the results but simply compares the results to the test criteria specified by the developer 302 in the development package that includes the code container, and then returns either a 'pass' code or a 'fail' code to the developer 302. The code can be updated and the tests can rerun until a 'pass' code is received. Thus, processes associated with the testing stage can be performed recursively if necessary, and the same is likewise true of any other processes performed by and/or at the direction of the deployment pipeline 250. Upon satisfactory completion of the testing, the integration phase is finished and the development package next moves to the staging phase 254.

As indicated in FIG. 3, processes performed at the staging phase 254 can be implemented by a staging deployment component 254*a* and a staging test component 254*b*. At the staging phase 254, there is no need to upload the development package again since it has already been saved. As well, a further verification process need not be performed at the staging phase 254. Otherwise however, the staging deployment component 254*a* and staging test component 254*b* can operate similarly, or identically, to the integration deployment component 252*c* and integration test component 252*d*, respectively, of the integration phase 252. As well, although illustrated separately, the integration deployment component 252*c* and the staging deployment component 254*a* can be the same component. Likewise, the integration test component 252*d* and the staging test component 254*b* can be the same component. Thus, separate deployment components and test components need not be supplied for the integration phase 252 and staging phase 254. After the staging phase 254 is complete, the development package then passes to the production phase 256.

In general, processes performed in the production phase 256 can be performed by trusted customers, arms-length developers, potential end-users, and/or any other designated users. In at least some embodiments, no verification is performed in the production phase 256, nor is there any need to download the code container again. Moreover, the production deployment component 256*a* and the production test component 256*b* can operate similarly, or identically, to the integration deployment component 252*c* and the staging test component 252*d*, respectively, of the integration phase 252. As well, although illustrated separately, the production deployment component 256*a*, the staging deployment component 254*a*, and the integration deployment component 252*c* can be the same component. Similarly, the production test component 256*b*, the staging test component 254*b*, and the integration test component 252*d* can be the same component.

As the foregoing makes clear, in the illustrated example of FIG. 3, there are a total of three (3) deploy/test evolutions, although more, or fewer, could be employed in other embodiments. As well, the testing at any given stage is performed independently of the testing at any other stage. As discussed in more detail below, this can be achieved with the use of different respective environmental units for the various testing stages.

Figure 3A:
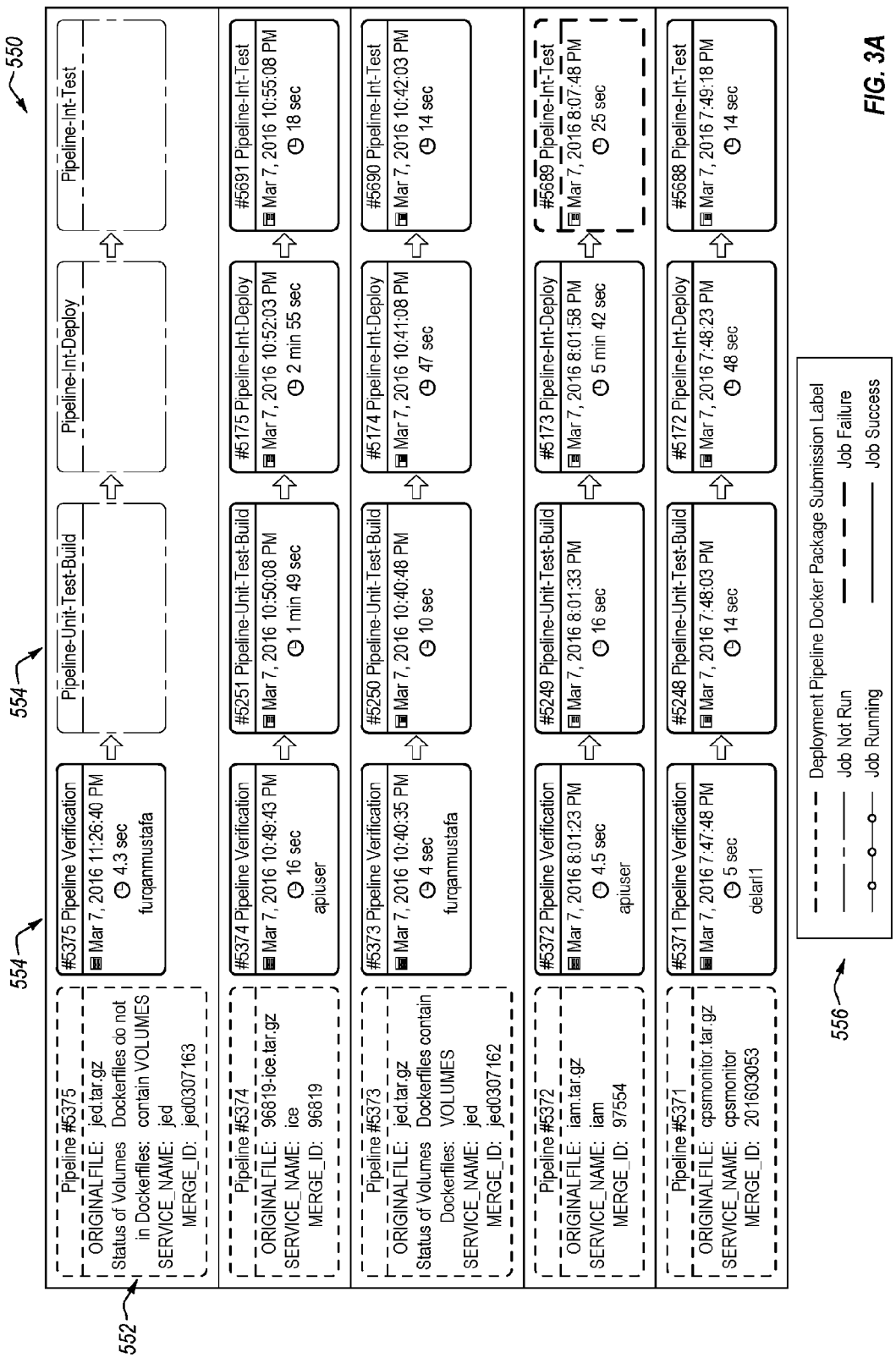
FIG. 3a discloses aspects of a UI for a deployment pipeline.

With reference now to FIG. 3*a*, details are provided concerning a user interface (UI) for a deployment pipeline, where one example of such a UI is denoted generally at 550. The UI can be displayed in a variety of locations, such as at a server that hosts the deployment pipeline application and/or at one or more developer machines.

As indicated the development pipeline can process multiple different development packages, each of which is indicated by a box 552 that includes basic information about the development package. As shown, such information can include, for example, the name of the development package, the name of the service that is performed by the code in the development package, and a MERGE_ID or version. Each of the development packages can be assigned a unique pipeline number, such as 'Pipeline 5375' in the upper most box 552.

The UI 550 also includes each stage 554 of the deployment pipeline arranged horizontally in serial fashion, so that a user can easily see which stages are involved in that portion of the development pipeline. Thus, in the illustrated example, the included stages are 'pipeline-verification,' pipeline-unit-test-build,' 'pipeline-int-deploy' and 'pipeline-int-test.' The stages 554 can be color coded, or otherwise presented to the user, so that a user can readily determine the status 556 of each stage 554. In more detail, any type and number of status codes 556 can be used and some example status codes 556 include 'job does not run,' 'job running,' 'job failure' and 'job success.'

The stages 554 can also include any other information that may be useful to a user. Examples of such information include, but are not limited to, the time and data a process was started, how long the process has been running, when the process completed/failed, and the username of the developer whose development package is being processed.

D. Aspects of an Example Environmental Unit (EU)

Figure 4:
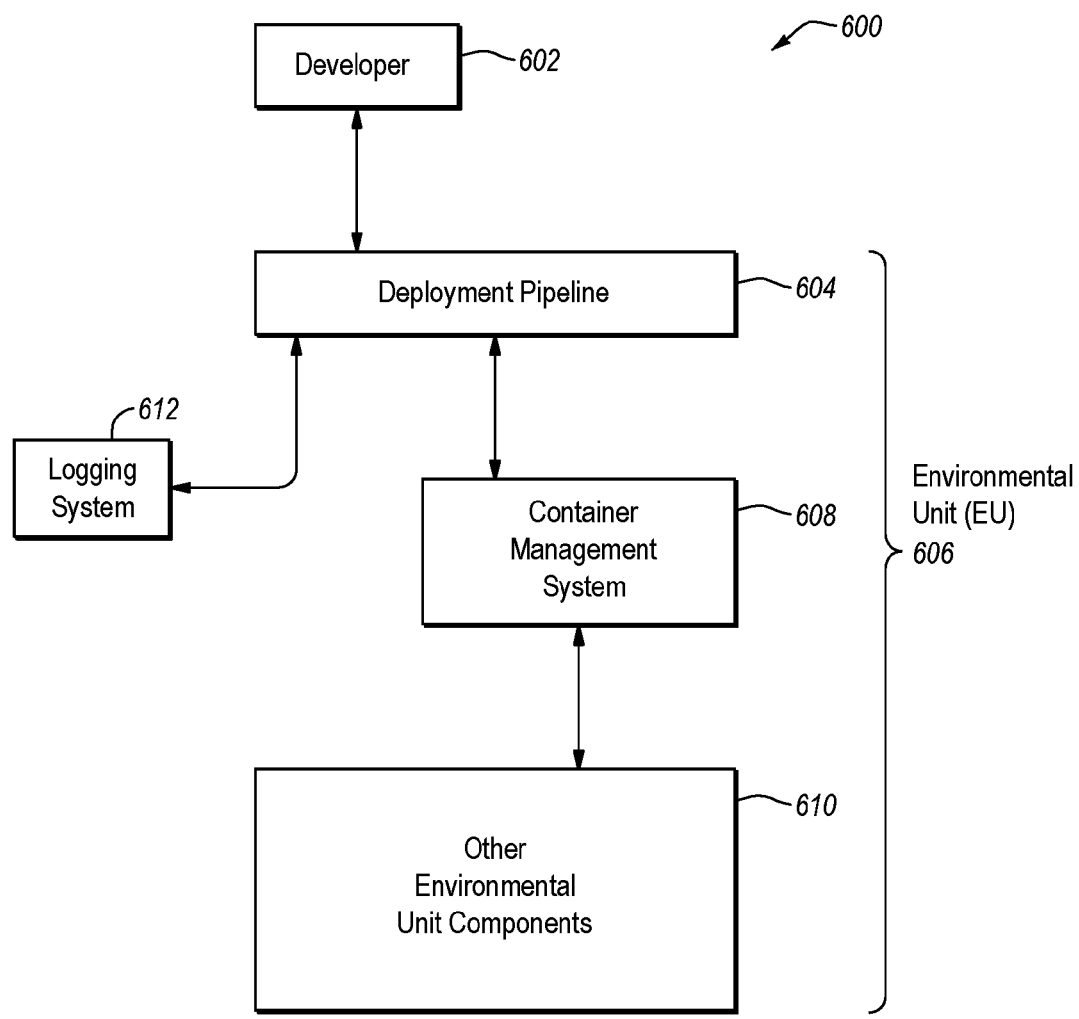
FIG. 4 discloses aspects of an example environmental unit (EU)
Figure 5A:
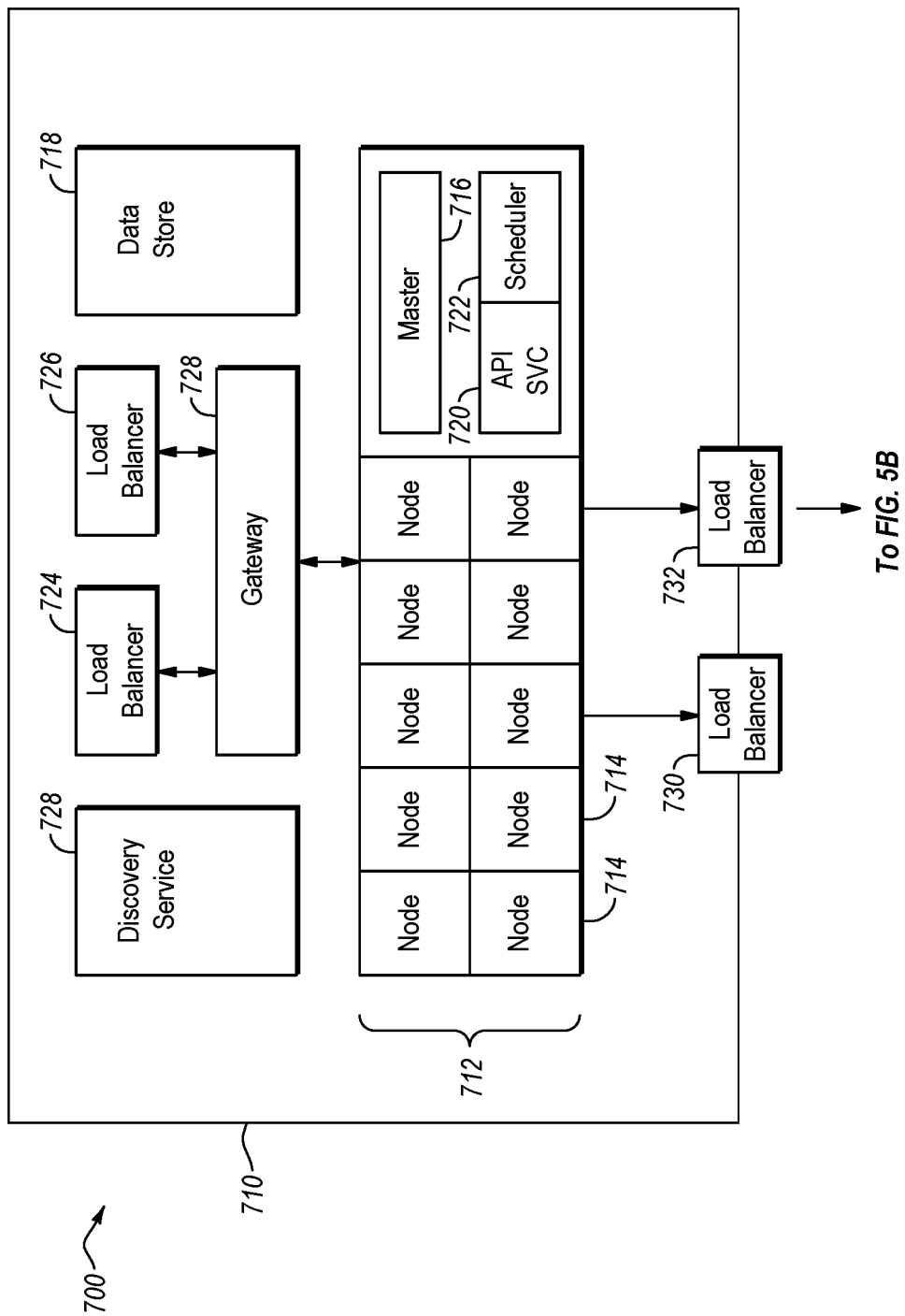
FIG. 5a discloses aspects of an example container management system.

Directing attention now to FIGS. 4, 5*a* and 5*b*, details are provided concerning an architecture that includes an environmental unit such as can be employed in at least some embodiments of the invention. With reference first to FIG. 4, a high level diagram is provided that discloses an architecture 600 that includes one or more developers 602 that communicate with a deployment pipeline 604. The deployment pipeline 604, in turn, communicates with one or more environmental units (EU) 606 that may include, for example, a container management system 608 and various other environmental unit components 610 that can communicate with the container management system 608.

With continued reference to FIG. 4, and directing attention now to FIGS. 5*a* and 5*b* as well, details are provided concerning a configuration that includes the deployment pipeline 604 and associated components 604*a*, 604*b* and 604*n* that may operate similar to the components disclosed in FIG. 3, and/or elsewhere herein. For the purposes of discussion, component 604*b* is assumed to be an integration deploy component (similar to integration deploy component 252*c*, for example), although component 604*b* could be any other component of a deployment pipeline that requires the services of a dedicated EU. More generally, one, some, or all of the stages of a deployment pipeline can be associated with a respective EU.

In some implementations, another EU can be used to test developer code before that code even enters the deployment pipeline 604. This additional EU can provide an added measure of assurance concerning the integrity and operability of the developer code as it relates to other code packages. This additional EU can be ad hoc and then dismantled after the developer code enters the deployment pipeline, or the additional EU can be allowed to persist.

As indicated, an example EU unit is denoted generally at 700 that includes a container management system 710 and various environmental unit components 750. In general, a respective EU can be provided for any stage of a deployment pipeline. One, some, or all, of the EU(s) employed in a particular embodiment can be cloned from an EU template. Thus, upon their initial creation at least, the clones may share a number of common characteristics and elements including, but not limited to, hardware, software packages, and operating system (OS). The OS may be configured to enable modeling of services and, in some embodiments, the OS may take the form of the open-source Ubuntu operating system. Notwithstanding their similarities, the EUs may operate independently of each other. After their initial creation, each of the clones can then be further configured to suit the specific requirements of the respective service or services with which that clone will be employed. As well, and discussed in more detail below, the clones may share a common logging service.

In other embodiments, the container management system 710 can be a separate element, rather than being integrated within the EU 700. In a least some embodiments, the container management system 710 takes the form of a Kubernetes container management system, although any other suitable container management system can alternatively be employed. The container management system 710 can include a cluster 712 of nodes 714. There can be any number of nodes 714 in the cluster 712. In some embodiments, each of the nodes 714 is, or at least includes, a virtual machine (VM) that may be provisioned to the extent necessary to enable the VMs to run the containerized applications created by the developers 302. Such provisioning may include, at least, an operating system (OS) and configuration components that enable the VM to communicate with other entities. In general, each of the VMs can run a corresponding container. On each of the nodes 714, one or more services can be run with respect to a container, or group of related containers (which may be referred to herein as a 'pod') that is downloaded to that node 714. Such services can include testing services, for example, although any other services can be run as well at the nodes 714, such as the gateway service disclosed elsewhere herein. A pod may be controlled as a single application at the node 714.

The container management system 710 can also include a 'master' 716 that can take the form of a server and, in the example case of a Kubernetes implementation, each of the nodes 714 can be designated a 'minion.' In general, the master 716 runs various services that are used to manage the workload of the cluster 712, and also and direct communications across the container management system 710. Some examples of these services and other functionalities of the container management system 710 are discussed below. In addition to those services, the container management system 710 can include a data store 718 which may store, among other things, configuration data that can be used by each of the nodes 714 in the cluster 712. In particular, the configuration information can be used for service discovery, and represents the state of the cluster 712 that each containerized application can reference to configure or reconfigure itself. In some embodiments, the Salt Cloud provisioning tool (application) can be used which enables treatment of the EU configuration as code that can be modified as needed, and thus can be used to provision the EU 700.

With regard now to the services, one example of a service run by the master 716 in the container management system 710 is an API service 720. The API service 720 allows a user, who can be an administrator for example, to configure the workloads and nodes 714 of the container management system 710. The API service 720 can employ a RESTful interface so that different tools and libraries can communicate with it. In some embodiments, the API service 720 can comprise, or employ, the Google Computer Engine (GCE) APIs.

In addition to the API service 720, the master 716 can also run a scheduler 722 to assign workloads to specific nodes 714 in the cluster 712. The scheduler 722 can read in the operating requirements of a service, analyze the current infrastructure environment, and place the work on an acceptable node 714 or nodes 714. As well, the scheduler 722 is responsible for tracking resource utilization on each node 714 to make sure that workloads are not scheduled in excess of the available resources. The scheduler 722 knows, or can determine, the total resources available on each node 714, as well as the resources allocated to existing workloads assigned on each node 714.

The scheduler 722 may operate in conjunction with one or more load balancers 724 and 726, for example. One or both of the load balancers 724 and 726 can be in the form of a high availability load balancer and proxy server for TCP and HTTP-based applications that spreads user requests for deployment of a container across the nodes 714 of the cluster 712. In some embodiments, one or more of the load balancers 724 and 726 can take the form of an HAProxy load balancer, although no specific implementation of the load balancers 724 and 726 is required. The load balancers 724 and 726 can be hosted on respective servers, or other computing devices.

The load balancers 724 and 726 can operate in conjunction with gateway 728. The gateway 728 can take the form of a gateway service such as an Infinity Access Management (IAM) service. While shown as a single element in FIG. 5a, the gateway 728 can take other forms. Thus, in some embodiments, each node 714 may be accessible by way of its own respective gateway, that is, a respective gateway service may run on each of the nodes 714.

As well, the gateway service can operate to field all API requests, or calls, that may be directed to deployed code instances at each node where code is deployed. The header of such a call can include a correlation ID that can be searched and mapped to all other calls that include the correlation ID, and the calls can be logged for later access. The correlation ID can be assigned by the user, or automatically assigned by the gateway service. In some instances, the call is only logged if an error occurs in the process involving the call while, in other embodiments, all of the calls can be logged regardless of whether or not an error occurs. In the former case, the call can be logged using syntax such as 'if an error [or error X] occurs, log correlation ID of call with error message.'

The use of a correlation ID can provide other benefits as well. For example, a call can be traced through all of the APIs implicated by that particular call. More specifically, the header of the call can be forwarded by a service API to the next service API, thus enabling a trace of the call. The path of the correlation ID, involved API(s), and header can be stored in connection with search and analytics functionalities, such as those provided by the Elasticsearch product (https://www.elastic.co/) for example.

With continued reference to FIGS. 4 and 5a, the container management system 710 may further include, or access, a discovery service 728. In general, the discovery service 728 can include or provide information that enables the developer code, residing in containers, to run in the particular EU with which that discovery service 728 is associated, since each EU has different respective requirements. One useful aspect of the discovery service 728 is that it may avoid the need to rebuild a container for use with a particular EU. Information, such as testing configuration information for example, can be provided to the discovery service by a user whose code is to be tested. In some instances, the discovery service 728 may be hosted on a node separate from the nodes 714, and this host node for the discovery service 728 may be referred to as a discovery node.

The information provided by the discovery service 728 can be obtained, for example, through the use of a library or other device in the development package created by the user such that when the container of that development package is downloaded to a node 714, the library looks for the discovery service 728 and obtains the required information. In one alternative approach, the user code may be written to include variables that know to look for configuration data when the code begins to run. One advantage of the discovery service 728 arrangement and configuration is that the information provided by the discovery service 728 need not be provided in the developer code and, accordingly, the provision of this information by the discovery service 728 has no effect on the developer code.

Other information that may be provided by the discovery service 728 includes metadata that services need in order to be able to communicate with the data storage and management platform 758. As another example, when a container starts up in the EU 700, the developer code in the container can query the discovery service 728 for information concerning where to run, how to operate, how to find needed information in the EU 700, how to authenticate, and how to find an API gateway. More generally, the discovery service 728 can include, among other things, any information that may be needed by code to run in the EU 700. As a final example, the discovery service 728 can include information concerning service dependencies, that is, information concerning the service or services, created by another developer, with which a particular developer code may need to interact. Thus, these service dependencies can be evaluated during testing of the developer code in the EU 700.

In some embodiments, the discovery service 728 can also track various changes at one, some, or all of, the nodes 714. Such changes could include, for example, when a new service comes online at a node 714, or a service moves from one or more nodes 714 to one or more other nodes 714, or when new instances of a particular service come online. The discovery service 728 can then register these changes at the gateway 728 and/or at one or more node-specific gateways. The change information obtained by the discovery service 728 can also be used by the load balancers 724 and 726 to more efficiently handle incoming requests.

As further indicated in FIG. 4a, the container management system 710 can include, or at least operate in connection with, one or more load balancers 730 and 732. More, or fewer, load balancers can be used. The load balancers 730 and 732 can be similar, or identical, to the load balancers 724 and 726 both in terms of configuration and functionality. In general, the load balancers 730 and 732 can operate to balance the loads placed on various other EU 700 components, examples of which are discussed below in connection with FIG. 5b.

With continued reference to FIGS. 4 and 5a, and directing attention now to FIG. 5b as well, details are provided concerning some further aspects of the example EU 700. These additional EU components are indicated generally as 750. The grouping of components in FIG. 5b is presented by way of example only and, in other embodiments, more, fewer, and/or different, components can be employed.

Among other things, the EU components 750 can include a key-value store 752. The key-value store 752 can include any of a variety of different types of information. Examples of such information include, but are not limited to, session information, user interface (UI) data, and UI server information.

In some embodiments, the key-value store 752 can take the form of a Redis key-value store, although that is not required. The key-value store 752 can comprise, or take the form of, a data structures server that supports different kinds of values. In some key-value stores, a string key is associated with a key value. In other embodiments, the value can be relatively more complex and need not be limited simply to a string. For example, other example data structures that can be used include, but are not limited to, binary-safe strings, lists which can also be referred to as linked lists (i.e., collections of string elements sorted according to the order of insertion.), sets (i.e., collections of unique, unsorted string elements), sorted sets (may be similar to sets but where every string element is associated to a floating number value, called score—the elements are always taken sorted by their score, so unlike with sets, it is possible to retrieve a range of elements (for example the following request could be made: return the top 10, or the bottom 10), hashes (which are maps composed of fields associated with values. Both the field and the value are strings), bit arrays—also referred to as bitmaps (with special commands, string values can be handled like an array of bits which can be set and cleared individually—e.g., find the first set or unset bit), and HyperLogLogs (a probabilistic data structure which is used in order to estimate the cardinality of a set).

The EU components 750 can include a queueing cluster 754 as well. In general, the queueing cluster 754 handles requests for services to be performed at the various nodes 714. Each request, which may come from a user or a container for example, can be added to the queue and when the requested service becomes available, the service processes the request. In some embodiments, the queueing cluster 754 can comprise or implement the RabbitMQ platform, although any suitable queuing functionality can alternatively be employed.

Another example element of the EU components 750 implementation is one or more virtual dedicated servers (VDS) 756. In general, a VDS 756 is a type of virtualization that enables a virtual server, which is a shared resource and not a dedicated server, to work and act as if it were a dedicated server. Each VDS 756 can have its own disk space, bandwidth, CPU allocation, memory and operating system. The VDS(s) 756 can be used for a variety of functions including, for example, storage of user information such as login and password, and any other information that a user may have a need to access. One or more of the VDS(s) 756 can include the Lightweight Directory Access Protocol (LDAP). In brief, LDAP is a directory service protocol that provides a mechanism used to connect to, search, and modify network (e.g., Internet) directories. The LDAP directory service is based on a client-server model. Any other suitable protocols can alternatively be employed.

With continued reference to FIG. 5b, the EU components 750 can also include a data storage and management platform 758, and an associated indexer 760. The data storage and management platform 758 can generally include any data or information relating to the provision of services, such as testing services for example, by one or more nodes 714 to developer code. Such data and information can be specified, for example, by users such as an administrative user and/or by a user, or users, who generated code that is to be evaluated in the EU.

The data in the data storage and management platform 758 can include, by way of example, event information relating to the testing of the code in the containers, information concerning the services provided by one or more nodes 714, access tokens for login (e.g., using the IAM service), information concerning users to be added or deleted, configuration data, and heartbeat information that indicates whether or not a particular service that is being run for the benefit of a customer is running or not. Some or all of the data in the data storage and management platform 758 may be customer data, that is, data associated with one or more customers who are accessing deployed services for purposes such as, but not limited to, backing up data at a cloud datacenter and/or retrieving backed up data. The data stored in the data storage and management platform 758 can be specified, for example, by the user who developed the code that is being evaluated in the EU 700.

In at least some embodiments, the data storage and management platform 758 can comprise, or be implemented as, the 'Cassandra' product made by Apache. In general, Cassandra is an open-source distributed database management system. The Cassandra platform can handle relatively large amounts of data that may be distributed across multiple servers 758a.

In conjunction with the data storage and management platform 758, the indexer 760 can take the form of an indexing, searching and navigation (ISN) platform. Among other things, the indexer 760 provides functionality that enables a user to search and navigate data in the data storage and management platform 758. In general, a respective instance 760a of the indexer 760 can be provided for each of the servers 758a.

With continued reference to FIGS. 5a and 5b, and directing particular attention again to FIG. 4, the architecture 600 can also include a logging system 612. In general, the logging system 612 can collect information generated during the running of developer code in one or more EUs. In some instances at least, the logging information can be collected and transmitted to the logging system 612 by the container management system 608. Information in the logging system 612 can then be provided by the deployment pipeline 604 to the developer(s) 602 and used by the developer(s) 602 to identify the nature of any problems that may have occurred. This information can then be used to modify the developer code and thereby resolve any problems.

In more detail, the services created by the code developers and running in the various EUs may be required to be stateless because those services can be shut down at any time, for example, by administration or operations personnel. If the service is shut down, any locally stored logs would be lost. Thus, the logging system 612 can be a centralized system that collects data from each of a plurality of EUs. Because the logging information can be centrally collected and stored, the shutdown of a service does not result in the loss of logging information that was collected while that service was running.

Each of the developers 602 can specify how information concerning the developer code should be logged, and may also specify, for example, the nature of the information that should be logged. The logging system 612 can take the form of a cluster of data nodes, although that is not necessarily required. The information collected by the logging system 612 can be organized in any suitable manner. In at least some embodiments, that information is organized by timestamp, thus enabling a developer to review, in chronological fashion, any problems that occurred with regard to the code created by that developer. As well, the developers have the ability to review log information for all instances of their service at once. This can be enabled, for example, by translating the names of logs associated with a particular service into names that include the name of that service.

In some implementations, a utility such as the .rsyslog log processing utility can be used to write the logs that are collected and stored by the logging system 612. The logs can have a .json format, although no particular format is required. The utility can be run on one, some, or all, of the nodes 714 in the cluster 712. In operation, the utility can read the log information into a template and then post to a search engine, such as an ElasticSearch engine (by ElasticSearch) that can be used, for example, by the indexer 760.

E. Aspects of Some Example Methods

Figure 6:
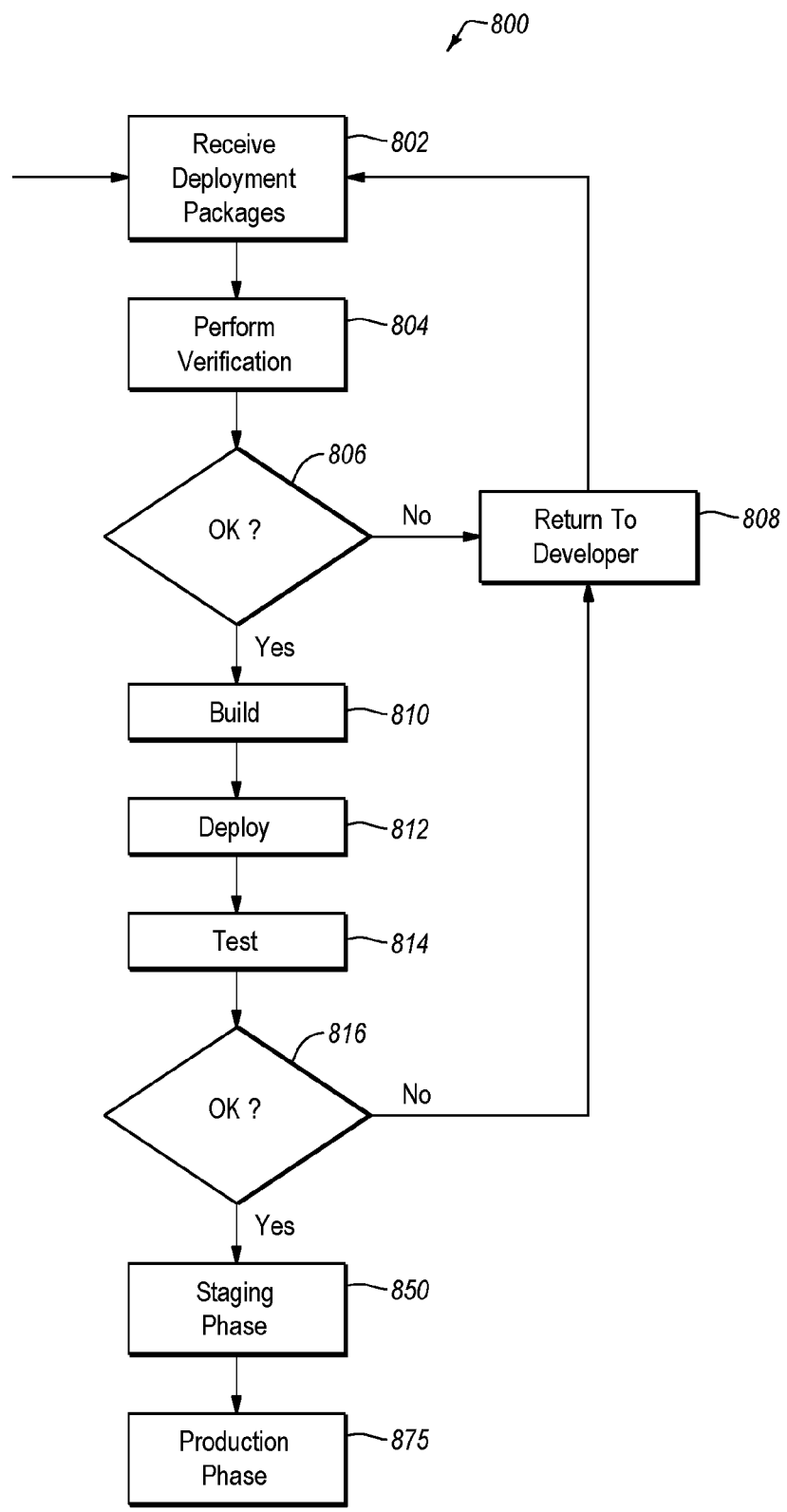
FIG. 6 discloses aspects of a method for developing and deploying a development package.
Figure 7:
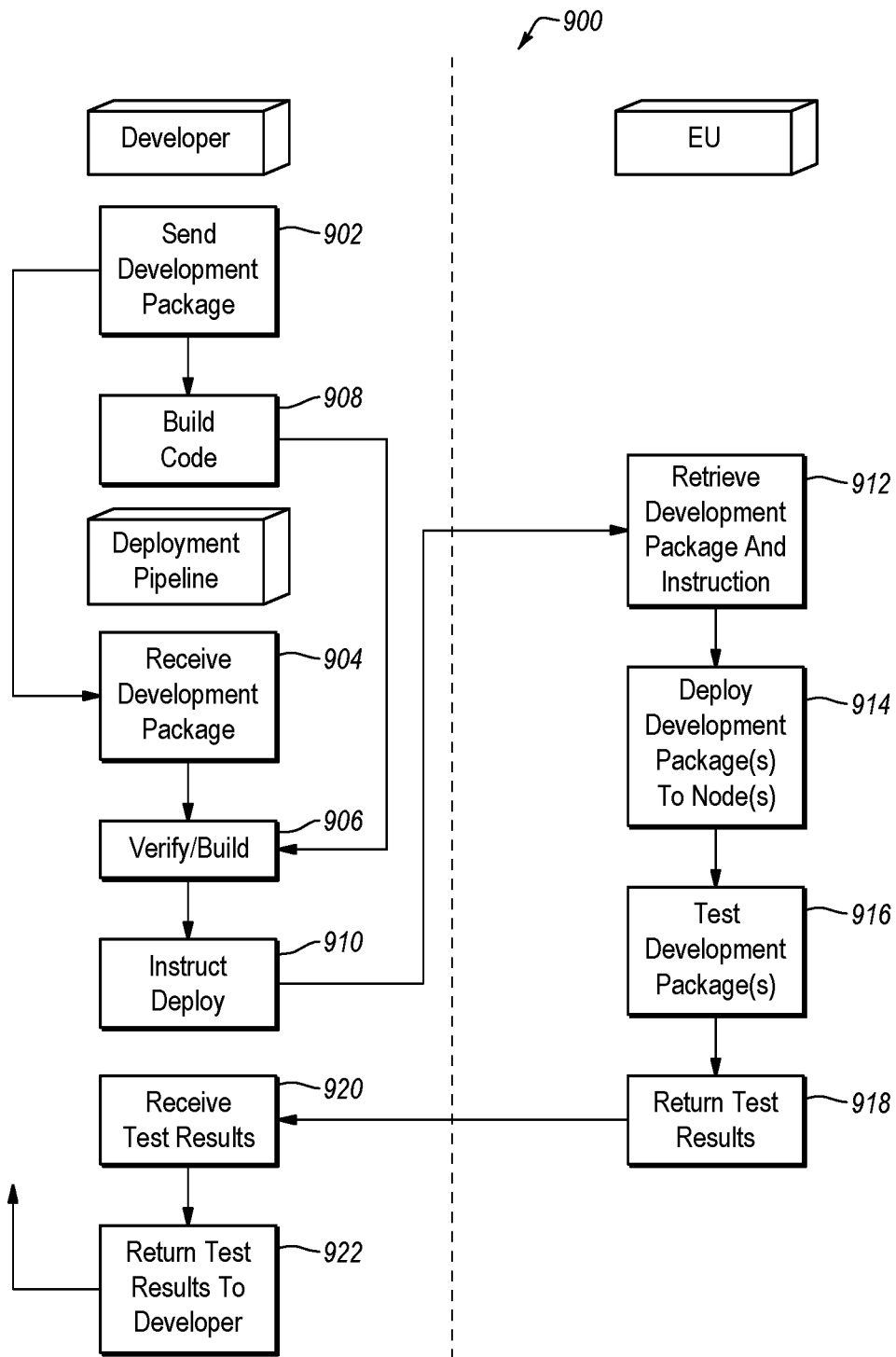
FIG. 7 discloses aspects of a method for deployment and testing of a development package.

With reference now to FIGS. 6 and 7, details are provided concerning some example methods within the scope of the invention. Turning first to FIG. 6, aspects of methods for operation of a deployment pipeline are disclosed, one example of which is denoted generally at 800. Among other things, the example method 800 may integrate code development and deployment into a single unified process. Part, or all, of the method 800 can be performed at a server that hosts a deployment pipeline application. The server can interact with one or more client machines running a developer application that interacts with the deployment pipeline application.

The method 800 can begin when an entity, such as a deployment pipeline, receives 802 a development package, or group of development packages. Each of the development packages can be associated with a respective function of a larger application, such as a data backup and/or restore application for example, that encompasses the development packages. The development packages can be uploaded to the deployment pipeline by the respective users who created the development packages. The development packages may be incomplete, at least inasmuch as they can include various components and information, but do not yet include code that is capable of performing the function that is to be carried out by the completed development packages. The development packages can be received 802 either simultaneously, or in serial fashion.

At some point after receipt of the development packages, the deployment pipeline can open the package and check to verify 804 that all the correct components and information are included in the development package are identified and verified. As noted elsewhere herein, such components and information can include, for example, the programming language expected to be used in development of the code that is to be added to the development package, any applicable definitions, a service name, version number, dependencies upon other services, and container information. The verification process 804 can also include checking to make sure that there are no code variables or other aspects of the development package that may cause errors or fails later on.

If the verification 804 reveals that there are any problems 806, the development package(s) is/are returned 808 to the developer for correction of any problems, after which the development package can be resubmitted and received 802 by the deployment pipeline. On the other hand, if the development package passes 806 the verification check, the process 800 can advance to the build stage 810. At the build stage 810, the developer, or developers, build the code that is to be included in the development package. In addition to the code, the developers can also, at the build stage 810 or some other point, create tests and test criteria for use in the testing of the code. Some artifacts needed to deploy and/or test the application in future stages are created and archived at this stage as well.

As a result of processes performed at the build stage 810, the code can be bundled together in a container, such as a docker container for example, that includes a docker file and a container .json. The docker container, in turn, can be included as an element of a file structure that also includes implementation details for the code, as well as tests and testing information for the code. This development package, which can take the form of a tar.gz file for example, or a .zip file, may further include a service name, merge ID (version code), and/or other information concerning the code and the function(s) it is configured to perform.

After the code for the development package, or packages, has been built 810, and the development packages completed, the process 800 can advance and the development package, including the code and other information, can be deployed 812 within the enterprise. In at least some instances, deployment 812 can be performed by, or at the direction of, a container management system in response to direction from the deployment pipeline. As noted herein, deployment 812 can involve, among other things, deployment of the development package to one or more nodes of a container management system. In some instances, related development packages can be deployed together as a pod.

After deployment 812 of the development package, testing 814 can then be performed on the developer code that is contained in the development package. In general, and as disclosed in more detail elsewhere herein, testing 814 can be performed in accordance with the tests, requirements, and criteria included in the development package. The code developer can define what constitutes acceptable test results and the test results can be returned from the deployment pipeline to the code developer for evaluation. If a determination 816 is made that the test results are unsatisfactory, the process can return to 808. On the other hand, if a determination 816 is made that the test results are satisfactory, the process 800 can advance to a staging phase 850 of the deployment pipeline.

The staging phase 850 can involve a staging deployment stage and a staging test stage. The staging deployment stage and the staging test stage of the staging phase 850 can be similar, or identical, to the integration deployment stage 812 and the integration test stage 814, respectively. After completion of the staging phase 850, the method 800 can advance to a production phase 875. Similar to the case of the staging phase 850, a production deployment stage and a production testing stage of the production phase 875 can be similar, or identical, to the integration deployment stage 812 and the integration test stage 814, respectively.

Turning now to FIG. 7, details are provided concerning example methods relating to interactions between a deployment pipeline and an environmental unit (EU). One example of such a method is denoted generally at 900. It should be noted that while various functions are allocated to particular entities in FIG. 7, and elsewhere herein, it should be understood that those allocations are presented only by way of example. Thus, in other embodiments, such functions can be differently allocated amongst the illustrated, or other, entities.

The method 900 can begin when a developer submits 902 a development package to the deployment pipeline. The deployment pipeline receives 904 the development package and performs a verification process 906, as disclosed elsewhere herein. When the development package is verified to be in order, which can be communicated to the developer, building 908 of the code for the development package can commence. Upon completion of the developer code, the development package can be stored, in a repository for example, so that it is accessible by the EU.

Whether on the initiative of a user, the deployment pipeline, or according to a schedule, for example, the deployment pipeline can then instruct 910 deployment of the development package. In the example process 900, the deployment instruction is sent to the EU and, more particularly, to a container management system of the EU. In response to the deployment instruction, the EU can then retrieve 912 the deployment package from the repository, which can be part of the EU or may be located elsewhere.

At 914, the EU can open the development package and deploy the developer code in accordance with instructions included in the development package. As noted elsewhere herein, the developer code can be deployed to multiple nodes, and may also be deployed together with developer code of one or more other development packages. Once deployed 914, the developer code in the development package can then be run and tested 916 as specified by the developer and/or others. The testing processes and other information can be specified in the development package.

After testing 916 has been completed, the outcome of the testing can be returned 918 to the deployment pipeline by the EU. In at least some embodiments, the EU makes no assessment as to whether or not the developer code passed the tests but, instead, simply returns the results which can then be received 920 by the deployment pipeline. Finally, the test results can be transmitted 922 to the developer for analysis and/or any corrective actions that may be required with respect to the developer code. Thus, in some instances, such as when a 'fail' code is generated because a test was not passed, the method 900 can return to 908, and the developer can modify the developer code as necessary.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a partially complete development package;
   verifying one or more parameters of the development package, and approving the development package for code development upon satisfactory verification;
   receiving developer code and packaging the developer code into the partially complete development package to create a completed development package;
   deploying, or causing the deployment of, the completed development package to a group of nodes; and
   testing, or causing the testing of, developer code of the completed development package at the nodes,
   wherein testing of the developer code comprises executing the developer code.

2. The method as recited in claim 1, wherein the partially complete development package includes code for testing processes and testing information.

3. The method as recited in claim 1, wherein the group of nodes are part of an environmental unit (EU).

4. The method as recited in claim 1, wherein deployment of the completed development package is performed by a container management system.

5. The method as recited in claim 1, wherein the completed development package includes a container that holds the developer code.

6. The method as recited in claim 1, wherein the recited processes collectively form an integration phase of a code deployment, and the method further comprises a staging phase that follows the integration phase, and a production phase that follows the staging phase.

7. The method as recited in claim 1, further comprising receiving one or more additional partially complete development packages, and packaging respective developer code in each of the partially complete development packages to create a plurality of completed development packages.

8. The method as recited in claim 7, wherein each completed development package is configured to be run and tested independently of each of the other completed development packages.

9. The method as recited in claim 1, wherein the recited processes collectively form an integration phase of a code deployment, and further comprising performing a check during the integration phase to verify that the code in the completed development package will operate correctly with code included in another completed development package.

10. A non-transitory storage medium having stored therein computer-executable instructions which, when executed by one or more hardware processors, implement and/or cause the implementation of the processes recited in claim 1.

11. A server, comprising:
    one or more hardware processors; and
    a non-transitory storage medium having stored therein computer-executable instructions which, when executed by the one or more hardware processors, perform the following operations:
    receiving a partially complete development package;
    verifying one or more parameters of the development package, and approving the development package for code development upon satisfactory verification;
    receiving developer code and packaging the developer code into the partially complete development package to create a completed development package;
    deploying, or causing the deployment of, the completed development package to a group of nodes; and
    testing, or causing the testing of, developer code of the completed development package at the nodes,
    wherein testing of the developer code comprises executing the developer code.

12. A non-transitory storage medium having stored therein computer-executable instructions which, when executed by one or more hardware processors, implement and/or cause the implementation of the following operations:
    creating a partial development package;
    transmitting the partially completed development package to a deployment pipeline;

receiving, from the deployment pipeline, information concerning a verification process performed on the partially completed development package by the deployment pipeline;

resolving any problems identified in the verification information;

building code that is executable to perform a process;

packaging the code into the partially completed development package to create a completed development package; and submitting the completed development package to the deployment pipeline.

13. The non-transitory storage medium as recited in claim 12, wherein the code in the completed development package is written in a language that is different from the language in a related development package, and both development packages are elements of a single application.

14. The non-transitory storage medium as recited in claim 12, wherein one or more of the recited processes are performed by way of a developer client that includes one or both of a user interface (UI) or application program interface (API).

15. The non-transitory storage medium as recited in claim 12, wherein the partially completed development package includes information concerning how the code is to be run and tested.

16. The non-transitory storage medium as recited in claim 12, wherein the operations further comprise receiving feedback concerning testing of the code.

17. The non-transitory storage medium as recited in claim 16, wherein the operations further comprise modifying the code based on the received feedback concerning the testing of the code, and packaging the modified code into the development package.

18. The non-transitory storage medium as recited in claim 12, wherein the code is built independently of any other code that may be related.

19. A server, comprising:

one or more hardware processors; and the non-transitory storage medium as recited in claim 12.

* * * * *